United States Patent
Edwards et al.

(10) Patent No.: US 12,488,022 B2
(45) Date of Patent: Dec. 2, 2025

(54) SYSTEMS AND METHODS FOR IDENTIFYING DATA LABELS FOR SUBMITTING TO ADDITIONAL DATA LABELING ROUTINES BASED ON EMBEDDING CLUSTERS

(71) Applicant: Capital One Services, LLC, McLean, VA (US)

(72) Inventors: Joshua Edwards, Philadelphia, PA (US); Purva Shanker, Arlington, VA (US); Jing Zhu, McLean, VA (US); Zhuqing Zhang, McLean, VA (US); Nathan Wolfe, Silver Spring, MD (US); Ebony Edwards, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/520,417

(22) Filed: Nov. 27, 2023

(65) Prior Publication Data

US 2025/0173359 A1    May 29, 2025

(51) Int. Cl.
  *G06F 7/00*    (2006.01)
  *G06F 16/28*    (2019.01)
(52) U.S. Cl.
  CPC .................... *G06F 16/285* (2019.01)
(58) Field of Classification Search
  CPC .................................................. G06F 16/285
  See application file for complete search history.

(56) References Cited

U.S. PATENT DOCUMENTS

| | | | | |
|---|---|---|---|---|
| 10,373,027 B1* | 8/2019 | Kim | ........................ | G06N 3/084 |
| 11,657,307 B1* | 5/2023 | Bodapati | ................ | G06N 20/00 |
| | | | | 706/15 |
| 11,841,851 B1* | 12/2023 | Rausch | ............... | G06F 16/2428 |
| 12,150,924 B2* | 11/2024 | Hoffman | ............... | A61K 9/0053 |
| 2008/0086433 A1* | 4/2008 | Schmidtler | ............ | G06N 20/10 |
| | | | | 707/E17.09 |
| 2008/0103996 A1* | 5/2008 | Forman | ................... | G06N 20/00 |
| | | | | 706/12 |
| 2010/0076923 A1* | 3/2010 | Hua | ........................ | G06N 20/00 |
| | | | | 706/61 |
| 2012/0281900 A1* | 11/2012 | Rueckert | ............ | G06V 10/7715 |
| | | | | 382/128 |

(Continued)

*Primary Examiner* — Mohammed R Uddin
(74) *Attorney, Agent, or Firm* — Foley & Lardner LLP

(57) ABSTRACT

Systems and methods for identifying data labels for submitting to additional data labeling routines based on embedding clusters are described. For example, the system may retrieve an unlabeled dataset, wherein the unlabeled dataset comprises a plurality of unlabeled samples. The system may generate a plurality of embeddings based on the unlabeled dataset, wherein the plurality of embeddings comprises a respective embedding for each unlabeled sample in the plurality of unlabeled samples. The system may cluster the plurality of embeddings into a plurality of clusters. The system may, based on the first cluster, determine a first labeled sample of the first labeled dataset corresponding to the first cluster and determine to submit the first labeled sample to a second data labeling routine. The system may generate, using the second data labeling routine, a second labeled sample based on the first labeled sample.

20 Claims, 5 Drawing Sheets

(56) References Cited

U.S. PATENT DOCUMENTS

| | | | |
|---|---|---|---|
| 2013/0097103 A1* | 4/2013 | Chari | G06N 20/10 707/E17.089 |
| 2019/0042953 A1* | 2/2019 | Duesterwald | G06F 18/214 |
| 2019/0205703 A1* | 7/2019 | Duesterwald | G06F 18/2178 |
| 2019/0362846 A1* | 11/2019 | Vodencarevic | G16H 50/20 |
| 2020/0034752 A1* | 1/2020 | Luo | H04L 51/42 |
| 2020/0151555 A1* | 5/2020 | Kozhaya | G06N 3/08 |
| 2020/0286614 A1* | 9/2020 | Do | G06N 7/01 |
| 2020/0320337 A1* | 10/2020 | Yoon | G06N 20/00 |
| 2020/0365160 A1* | 11/2020 | Nassar | G10L 25/78 |
| 2020/0394461 A1* | 12/2020 | Perera | G06N 7/01 |
| 2021/0201892 A1* | 7/2021 | Lyu | G06N 20/00 |
| 2021/0256401 A1* | 8/2021 | Elkind | G06F 21/56 |
| 2021/0256420 A1* | 8/2021 | Elisha | G06N 20/00 |
| 2021/0264300 A1* | 8/2021 | Staudinger | G06V 10/762 |
| 2021/0357776 A1* | 11/2021 | Quader | G06N 20/20 |
| 2021/0406644 A1* | 12/2021 | Salman | G06N 3/045 |
| 2022/0019741 A1* | 1/2022 | Roy | G06F 40/30 |
| 2022/0058440 A1* | 2/2022 | Feng | G06F 18/2178 |
| 2022/0138561 A1* | 5/2022 | Prendki | G06N 3/08 706/12 |
| 2022/0318229 A1* | 10/2022 | Shreve | G06F 16/2379 |
| 2022/0318621 A1* | 10/2022 | Gong | G06N 3/006 |
| 2022/0335311 A1* | 10/2022 | Lahlou | G06N 3/084 |
| 2023/0076083 A1* | 3/2023 | Mishra | G06F 18/2148 |
| 2023/0101474 A1* | 3/2023 | Kumar | G06N 20/00 706/12 |
| 2023/0196117 A1* | 6/2023 | Du | G06N 3/0895 382/155 |
| 2023/0267175 A1* | 8/2023 | Jain | G06F 18/22 706/15 |
| 2023/0350880 A1* | 11/2023 | Shreve | G06N 3/045 |
| 2023/0376793 A1* | 11/2023 | Lehmann | G06N 5/022 |
| 2023/0376858 A1* | 11/2023 | Tal | G06N 20/20 |
| 2023/0419121 A1* | 12/2023 | Poms | G06N 20/00 |
| 2024/0054397 A1* | 2/2024 | Nainggolan | G06T 7/00 |
| 2024/0062051 A1* | 2/2024 | Baran Pouyan | G06N 20/20 |
| 2024/0160914 A1* | 5/2024 | Kutt | G06N 3/084 |
| 2024/0163298 A1* | 5/2024 | Wang | H04L 63/1416 |
| 2024/0220579 A1* | 7/2024 | Mhatre | G06F 18/2155 |
| 2024/0289354 A1* | 8/2024 | Bhattacharya | G06F 16/285 |
| 2024/0362735 A1* | 10/2024 | Lombard | G06Q 10/0635 |
| 2024/0378500 A1* | 11/2024 | Chalkidis | G16H 50/70 |
| 2024/0386320 A1* | 11/2024 | Ma | B41J 2/01 |
| 2024/0386733 A1* | 11/2024 | Garg | G06V 10/267 |
| 2024/0393323 A1* | 11/2024 | Tang | G01N 33/54326 |

* cited by examiner

SYSTEMS AND METHODS FOR IDENTIFYING DATA LABELS FOR SUBMITTING TO ADDITIONAL DATA LABELING ROUTINES BASED ON EMBEDDING CLUSTERS

BACKGROUND

Data labeling is a process by which annotations, tags, or labels are added to raw data, particularly in the context of machine learning and artificial intelligence projects. Data labeling is a crucial step in the process of creating training datasets for supervised machine learning algorithms. These labels help the algorithms learn patterns and make predictions or classifications based on new, unseen data. Data labeling is often a labor-intensive and time-consuming process, requiring a high level of accuracy and consistency to produce reliable training data for machine learning models.

Due to the labor-intense and time-consuming process of data labeling, the data labeling increasingly uses artificial intelligence, including, but not limited to, machine learning, deep learning, etc. (which may be referred to collectively herein as "artificial intelligence models," "machine learning models," or simply "models"), to label data. Key benefits of artificial intelligence are its ability to process data, find underlying patterns, and/or perform real-time determinations. However, despite these benefits, practical implementations of artificial intelligence-based solutions for data labeling have been hindered by several technical problems.

First, artificial intelligence requires large amounts of high-quality training data in order to correctly determine what label to apply. The process for obtaining this data and ensuring that it is high quality can be complex and time-consuming. This is further exacerbated by the fact that many labeling tasks involve subjective judgment and/or ambiguous cases. Without adequate training data (if it exists at all), models may struggle to handle situations where there is no clearly correct answer and/or when multiple interpretations are possible. Second, even after a model is properly trained, a shift in a domain, context, or potential classifications may require the model to be completely retrained. For example, models trained on specific domains or contexts may struggle to generalize to new, unseen situations. If the distribution of data used for training differs significantly from the data in the real-world application, the model's performance can degrade. Finally, if the training data is noisy or contains errors, the model's output can also be inaccurate, which can create a feedback loop where inaccurate labels lead to further training of the model, perpetuating the problem.

SUMMARY

In view of the technical problems associated with a reliance on training data for data labeling when using an artificial intelligence-based solution, systems and methods are described herein for improvements to data labeling that are independent of additional, updated, and/or modified training data. That is, as opposed to a "more data" approach, the systems and methods provide improvements to data labeling irrespective of the amount, context, and/or noise in training data. As a further benefit of the systems and methods not relying on modifications to training data for the proposed improvements, the systems and methods may be adapted to currently trained models and/or datasets. To achieve these improvements without affecting the underlying training data, the systems and methods use a hybrid data labeling approach that uses a mix of different data labeling routines. That is, the systems and methods use a hybrid data labeling process that includes a first data labeling routine and a second data labeling routine. The data labeling routine may differ based on their respective data collections, labeling guidelines, labeler selections, labeling processes, iterations, and/or ambiguity review processes.

However, a hybrid approach to data labeling would create several novel technical challenges resulting in low accuracy and inconsistent results. For example, maintaining label consistency across a dataset is important for training reliable models. A conventional hybrid approach would result in inconsistencies due to variations in their labeling decisions because automated labeling from a first routine (e.g., generated via a first model) may result in inconsistent labeling decisions from a second routine (e.g., generated via a second model). Furthermore, any mixture of automated labeling and/or manual review may introduce inconsistencies that lack the commonsense reasoning that humans rely on to determine context as well as generate results that can be difficult to review as the process by which the results are made (e.g., based on artificial intelligence-based solutions) may be unknown or obscured. This obscurity can create hurdles for identifying errors in the results, comparing the results of models, improving the models providing the results, and/or comparing automated results to those generated manually. Finally, a hybrid approach may introduce bias into the results as an automated labeler may not provide the same label classification as a manual one (or other model), even with the same underlying sample.

To overcome these novel technical challenges, the systems and methods identify data labels for submitting to additional data labeling routines based on embedding clusters. Based on these embedding clusters, the system and methods may determine whether to review a data label using a different (e.g., independent) data labeling routine. Using the embedding, the system may cluster the individual labeled samples and may then prioritize labeled data samples for review based on an analysis of the cluster to which it belongs. By doing so, the systems and methods may address consistency concerns across labels generated by different data labeling routines. Moreover, through the use of an independent data labeling routine that addresses review of data labels based on the cluster analysis, the systems and methods avoid introducing bias into that review procedure.

In some aspects, systems and methods for identifying data labels for submitting to additional data labeling routines based on embedding clusters are described. For example, the system may retrieve an unlabeled dataset, wherein the unlabeled dataset comprises a plurality of unlabeled samples. The system may generate a plurality of embeddings based on the unlabeled dataset, wherein the plurality of embeddings comprises a respective embedding for each unlabeled sample in the plurality of unlabeled samples. The system may cluster the plurality of embeddings into a plurality of clusters. The system may generate a first labeled dataset based on the unlabeled dataset, wherein the first labeled dataset comprises a first plurality of labeled samples, and wherein the first plurality of labeled samples is generated using a first data labeling routine, wherein the first data labeling routine uses a first model. The system may determine that a first cluster of the plurality of clusters has a first cluster characteristic. The system may, based on the first cluster having the first cluster characteristic, determine a first labeled sample of the first labeled dataset corresponding to the first cluster and determine to submit the first labeled sample to a second data labeling routine. The system may generate, using the second data labeling routine, a second labeled sample based on the first labeled sample.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
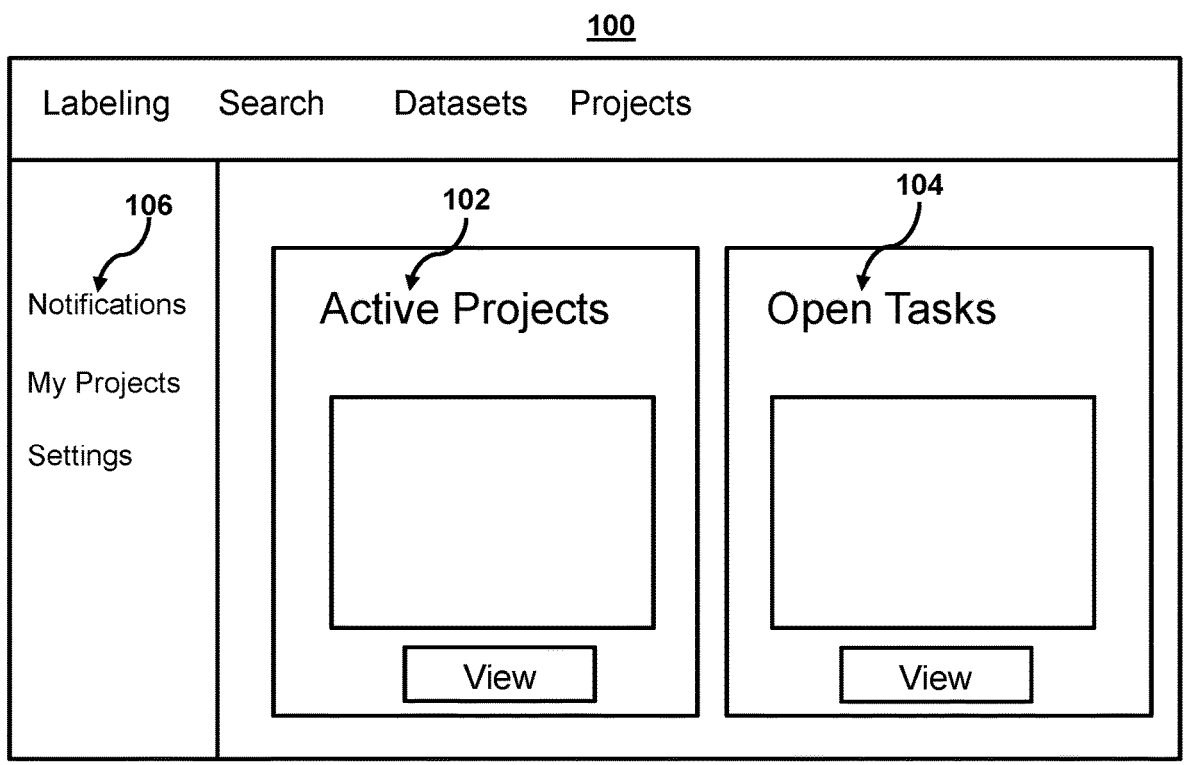
FIG. 1A shows an illustrative diagram for a user interface for data labeling, in accordance with one or more embodiments.

FIG. 1A shows an illustrative diagram for a user interface for data labeling, in accordance with one or more embodiments. For example, FIG. 1A shows user interface 100. User interface 100 may comprise a user interface for data labeling. For example, using user interface 100, a user may access active projects (e.g., project 102), review data labeling tasks (e.g., task 104), and/or receive one or more notifications (e.g., notification 106). For example, the system may perform data labeling (either automatically or manually). Data labeling is the process of identifying raw data (images, text files, videos, etc.) and adding one or more meaningful and informative labels to provide context so that a machine learning model can learn from it. As such, the system may receive a sample and determine a label for the sample.

As referred to herein, a label may comprise any content. For example, the label may comprise a classifying phrase or name applied to a person or thing. In some embodiments, the label may comprise a potential intent or other classification of a user. For example, the label may comprise information about a user or received information. Additionally or alternatively, the label may include a quantitative or qualitative metric of the determined accuracy of a label (e.g., a categorization applied to a record).

In some embodiments, user interface 100 may be used for maintaining rights management while labeling data for artificial intelligence model development. For example, the system may receive a first label for a first sample from a first data source. It should be noted that a sample may comprise any type of content. In some embodiments, "content" should be understood to mean an electronically consumable user asset, such as Internet content (e.g., streaming content, downloadable content, webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another but consumed and/or published by the user.

Using user interface 100, the system may receive a plurality of user inputs into a user interface. In some embodiments, a "user interface" may comprise a human-computer interaction and communication in a device and may include display screens, keyboards, a mouse, and the appearance of a desktop. For example, a user interface may comprise a way a user interacts with an application or a website.

The system may then determine, based on the plurality of user inputs, first version metadata of the first label for the first sample, wherein the first label comprises a proposed label for the first sample assigned by a first user. The system may use one or more data labeling techniques. For example, the system may use internal labeling, which involves using in-house data science experts to generate labels. By doing so, the system simplifies tracking, provides greater accuracy, and increases quality. However, this approach typically requires more time and favors large companies with extensive resources. Additionally or alternatively, the system may use synthetic labeling. This approach generates new project data from preexisting datasets, which enhances data quality and time efficiency. However, synthetic labeling requires extensive computing power, which can increase costs. Additionally or alternatively, the system may use programmatic labeling, which may comprise automated data labeling processes that use scripts to reduce time consumption and the need for human annotation. However, the possibility of technical problems requires the process to remain a part of the quality assurance (QA) process. Additionally or alternatively, the system may use outsourcing and/or crowdsourcing. These approaches are quicker and more cost-effective due to their micro-tasking capability and web-based distribution. However, worker quality, QA, and project management vary across crowdsourcing platforms.

As referred to herein, a dataset may include a collection of related sets of information that is composed of separate elements but can be manipulated as a unit by a computer. The dataset may comprise any content. For example, the content may comprise all types of information that may be relevant for computing purposes and in particular for labeling purposes. For example, the dataset may comprise a list of labels that includes potential intents of data, categories of data, etc.

For example, the system may manage information and segregate data between different workspaces. In software development, a workspace is a grouping of source code files that make up a larger unit, like a web page, website, or program. The workspace is usually a file or directory. For software as a service, a workspace describes online applications that allow users to organize and exchange files with other users over the Internet. In a graphical interface, a workspace is a grouping of application windows used by a window manager application to help reduce clutter on the desktop screen. Workspaces are commonly found on Unix operating systems.

For example, the system may assign the first version metadata to a first workspace, wherein the first workspace is accessible to a second subset of the plurality of users (e.g., users having credentials to access the first workspace). The system may determine, based on a first user input from a first user, a first credential requirement for accessing the first version metadata. The system may then use this credential requirement to determine whether to grant access to the training data. For example, the system may receive, from a second user, a second user input requesting access to training data for an artificial intelligence model based on version metadata of labels in the first workspace. In response to the second user input, the system may determine whether to grant access to the training data based on a first comparison of user profile data for the second user and the first credential requirement.

The system may monitor content generated by the user and/or about the user to generate user profile data. In some embodiments, "a user profile" and/or "user profile data" may comprise data actively and/or passively collected about a user. For example, the user profile data may comprise content generated by the user and a user attribute for the user. A user profile may be content consumed and/or created by a user. In some embodiments, an attribute may include information about a user and/or information included in a directory of stored user settings, preferences, and information for the user. For example, a user profile may have the settings for the user's installed programs and operating system. In some embodiments, the user profile may be a visual display of personal data associated with a specific user or a customized desktop environment. In some embodiments, the user profile may be a digital representation of a person's identity. The data in the user profile may be generated based on the system actively or passively monitoring.

Figure 1B:
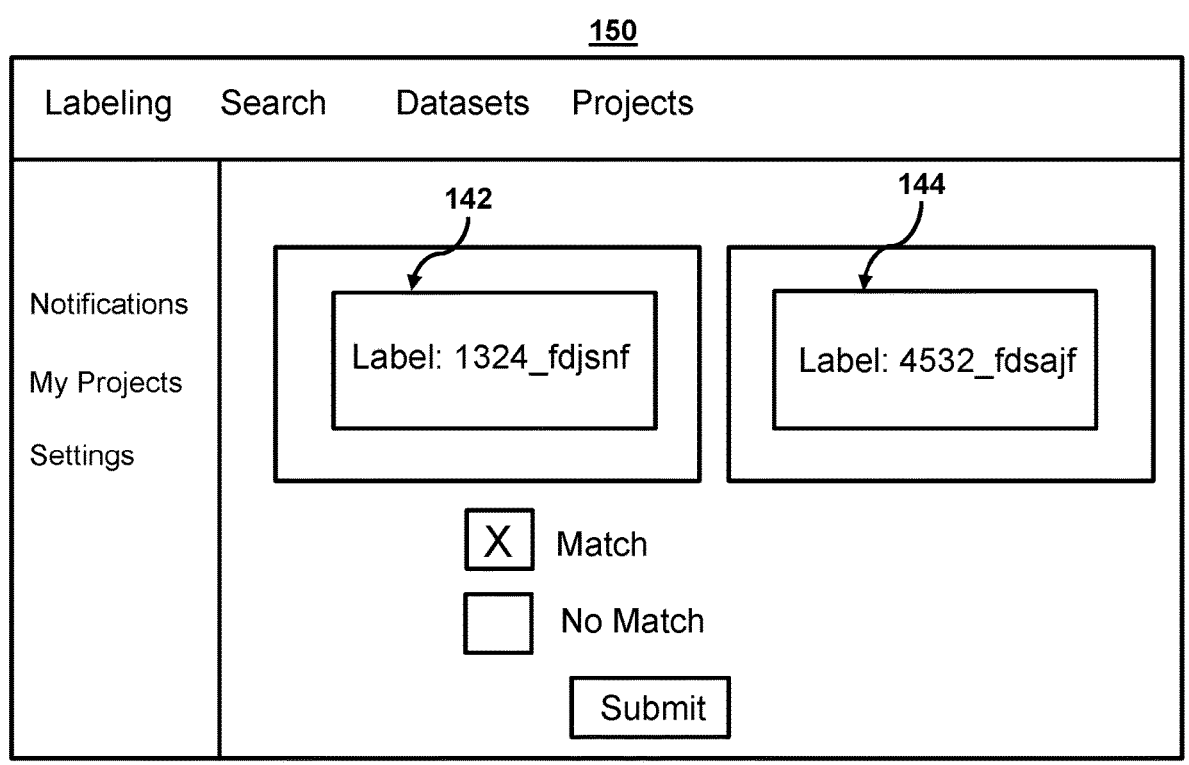
FIG. 1B shows an illustrative diagram for a user interface used for manual review of data labels, in accordance with one or more embodiments.

FIG. 1B shows an illustrative diagram for a user interface performing consistency review during data labeling, in accordance with one or more embodiments. For example, in response to determining to grant access to the training data based on a first comparison of user profile data and a first credential requirement, the system may present user interface 150. For example, user interface 150 shows the comparison of first version metadata (e.g., metadata 142) and second version metadata (e.g., metadata 144). For example, the system may compare similar version metadata for a label to previous versions to ensure quality and/or consistency. For example, in order to ensure consistency, previously labeled data may need to be compared to unlabeled data in order to ensure that the labeling is consistent (i.e., similar data receives similar labels).

Using user interface 150, a data labeler may review one or more labels. For example, user interface 150 may represent a data label that was automatically generated. Data labelers are often tasked with examining and understanding the data, then assigning appropriate labels or annotations that capture the desired information. For instance, in an image recognition task, a data labeler might label objects within images to help train a model to recognize those objects in new images. Similarly, in natural language processing (NLP) tasks, labelers might assign sentiment labels to text data for sentiment analysis models.

Data labeling can involve various types of annotations, such as classification of labels (e.g., assigning categories or classes to data instances, such as classifying images of animals into different species), bounding boxes (e.g., drawing boxes around objects within images to indicate their location and boundaries), segmentation masks (e.g., drawing boxes around objects within images to indicate their location and boundaries), sentiment labels (e.g., assigning sentiment scores or labels (e.g., positive, negative, neutral) to text data), named entity recognition (e.g., identifying and labeling specific entities (like names, dates, locations) within text), part-of-speech tagging (e.g., labeling individual words in sentences with their grammatical parts of speech), and/or temporal labels (e.g., marking time-related information, such as event dates or durations).

During the comparison, the system may analyze the metadata for similarities and compare a consistency determined based on the similarities to a threshold similarity. For example, the system may determine to store a first version metadata in a data source specific to a workspace. The data source may comprise a two-dimensional database, wherein the first version metadata is assigned to a first row of the two-dimensional database. The system may use a flat-file database to ease review and/or retrieval of data. Flat-file databases are useful as easy-to-create and easy-to-maintain data files for commonly accessed information such as name and address files, labels, etc. A flat-file database's simplicity is advantageous as a low-overhead, easy-to-access way to store voluminous information that needs to be preserved in its native state.

For example, using user interface 150, a user may retrieve the version metadata of labels from the data source. Notably, the system may use a flat file for storing the version metadata. A flat file is a collection of data stored in a two-dimensional database in which similar yet discrete strings of information are stored as records in a table. The columns of the table represent one dimension of the database, while each row is a separate record. The information stored in a flat file is generally alphanumeric with little or no additional formatting. The structure of a flat file is based on a uniform format as defined by the type and character lengths described by the columns. By doing so, the version metadata may be easily annotated, new version metadata may be easily added, and/or current version metadata may be easily compared. In some embodiments, the system may use a comma-separated values (CSV) file. A CSV file is one in which table data is gathered in lines of American Standard Code for Information Interchange (ASCII) text with the value from each table cell separated by a comma and each row represented by a new line. Columns and rows are typically delimited by tabs or commas, such as in CSV files. A flat-file database comprises a single table.

The system may then compare the version metadata of labels for consistency. In some embodiments, the system may use a flat-file database to ease comparison of data and/or in the management of object-oriented storage systems. Object storage is commonly used by cloud storage services because it can accommodate massive volumes of data. The data stored on object systems is managed by a non-hierarchical flat-file database that retains basic information about the data, such as the filenames and where they are stored on media.

In some embodiments, the system may receive one or more inputs into a user interface for a workspace. The one or more inputs may cause data within the workspace to be modified and/or stored in the workspace. Notably, the data outside the workspace (e.g., data from other datasets) is not affected. The system may receive a first user input of a proposed label for the first sample as assigned by a first user. The system may receive a second user input to store the proposed label to the first sample in the first grouping of source code files.

In some embodiments, the system may receive one or more inputs into a user interface for a workspace that may cause the data within the workspace to be altered. As one example, the data in the workspace may be updated with a proposed label for a sample. In such cases, the system may add a pointer to a location of the sample (e.g., stored in another dataset) in order to conserve overall resources. The system may update a first record in the first grouping of source code files with a proposed label for the first sample as assigned by a first user. The system may update a second record in the first grouping of source code files with a pointer to a location of the first sample.

In some embodiments, the first version metadata may comprise information about a category within which the label belongs. For example, the label category may indicate a potential use for the label, a context of the label, etc. The system may categorize the labels as well as generate a confidence level for the categorization. By doing so, the system may allow users within a given workspace to indicate which labels are similar (or not similar) and may thus adjust the training data for a given workspace. The system may receive a label category for the first label. The system may receive a confidence level of the first label, wherein the confidence level indicates a likelihood that the first label is consistent with other labels in the label category.

In some embodiments, the first version metadata may comprise a confidence level (e.g., either assigned manually or automatically). The system may then compare the confidence level to a threshold confidence level. By doing so, the system may allow users within a given workspace to indicate which labels are similar (or not similar) as well as how confident any given label must be for the training purposes in a given workspace. The system may receive a threshold confidence level for the first grouping of source code files. The system may compare the confidence level to the threshold confidence level.

In some embodiments, the system may display native data for the first sample. For example, the version metadata may include native data as well as any transformer data (e.g., describing one or more transformations during feature engineering). Native data may comprise native data or native data formats comprising data that originates from and/or relates to the unlabeled data sourced from a raw data source (e.g., data source 206 (FIG. 2)). In some embodiments, native data may include data resulting from native code, which is code written specifically for an application or received from an application, and/or a respective plugin designed therefor. In some embodiments, the system may review a labeling decision for consistency. The system may generate for display native data corresponding to the first sample. The system may generate for display feature transformation data for the first sample.

The feature transformation data may be presented in any format and/or representation of data that can be naturally read by humans. In some embodiments, the feature transformation data may appear as a text string. For example, the feature transformation data may comprise a description of one or more features and/or a feature engineering workflow performed on the native data. In such cases, determining a feature engineering workflow (and/or individual tasks, feature nodes, etc.) may comprise determining a plurality of nodes for feature engineering workflow as well as information about each node.

The feature engineering pipeline management system may monitor the status of one or more feature engineering projects (e.g., based on one or more datasets and/or knowledge databases). Each project may comprise selected and transformed variables created using a predictive machine learning or statistical model. Each project may comprise feature creation, feature transformation, feature extraction, and/or feature selection.

For example, feature creation may comprise creating new features from existing data to generate better predictions. In some embodiments, the system (e.g., model 302 (FIG. 3) below) may use feature creation techniques including: one-hot encoding, binning, splitting, and calculated features. In another example, feature transformation and imputation may comprise replacing missing features or features that are not valid. The system (e.g., model 302 (FIG. 3) below) may use techniques that include: forming Cartesian products of features, non-linear transformations (such as binning numeric variables into categories), and/or creating domain-specific features. In yet another example, feature extraction may involve reducing the amount of data to be processed using dimensionality reduction techniques. The system (e.g., model 302 (FIG. 3) below) may use techniques including: Principal Component Analysis (PCA) and Linear Discriminant Analysis (LDA), which reduces the amount of memory and computing power required while still accurately maintaining original data characteristics. In yet another example, feature selection may involve selecting a subset of extracted features. The system (e.g., model 302 (FIG. 3) below) may use this to minimize the error rate of a trained model as feature importance score and correlation matrix may be factors in selecting the most relevant features for model training.

In some embodiments, the system may determine a feature engineering workflow for generating the first version metadata. Feature engineering is the process of selecting, manipulating, and transforming raw data into features that can be used in artificial intelligence learning. For example, feature engineering may leverage data to create new variables that are not in an existing training set. Additionally or alternatively, featuring engineering may produce new features for both supervised and unsupervised learning, with the goal of simplifying and speeding up data transformations while also enhancing model accuracy.

The feature engineering workflow may comprise a plurality of feature nodes, wherein each feature node corresponds to respective feature transformation data. For example, each feature node may correspond to one or more transformations and/or other processes applied to data during the feature engineering process. The combination of these transformations may comprise a feature engineering workflow. Furthermore, each feature node may comprise additional tasks (e.g., an additional subset of transformations) corresponding to each feature node. These additional nodes may also comprise additional transformations. For example, the feature node may comprise a connection point that corresponds to and/or performs a transformation. The feature node may correspond to a particular reformatting process, quality check, and/or other step during an engineering workflow.

For example, feature transformer data corresponding to a node may comprise code that describes one or more transformations of native data. Feature transformer data corresponding to a node may comprise a log transform, a scaling operation, and/or a normalization/standardization of native data. For example, after a scaling operation, the continuous features become similar in terms of range. Distance-based algorithms like k-NN and k-Means require scaled continuous features as model input. Similarly, standardization (also known as z-score normalization) is the process of scaling values while accounting for standard deviation. If the standard deviation of features differs, the range of those features will likewise differ. The effect of outliers in the characteristics is reduced as a result. To arrive at a distribution with a 0 mean and 1 variance, all the data points are subtracted by their mean and the result divided by the distribution's variance.

In contrast, feature transformer data corresponding to the node may comprise code that describes one or more transformations of native data (e.g., data received by a node corresponding to feature transformer data). Feature transformer data corresponding to the node may comprise one-hot encoding. A one-hot encoding is a type of encoding in which an element of a finite set is represented by the index in that set, where only one element has its index set to 1 and all other elements are assigned indices within the range [0, n−1]. In contrast to binary encoding schemes, where each bit can represent two values (e.g., 0 and 1), this scheme assigns a unique value for each possible case.

In some embodiments, the values, parameters, and/or other data corresponding to the feature transformer data may be selected and/or generated as an output of an artificial intelligence model (e.g., model 302 (FIG. 3)). For example, as described above, feature engineering (and/or training a model therefor) may comprise selecting and transforming variables when creating a predictive model using machine learning or statistical modeling. In particular, the system may generate feature transformation data that optimizes the feature creation, feature transformation, feature extraction, and feature selection. With deep learning, the feature engineering is automated as part of the algorithm learning.

Figure 2:
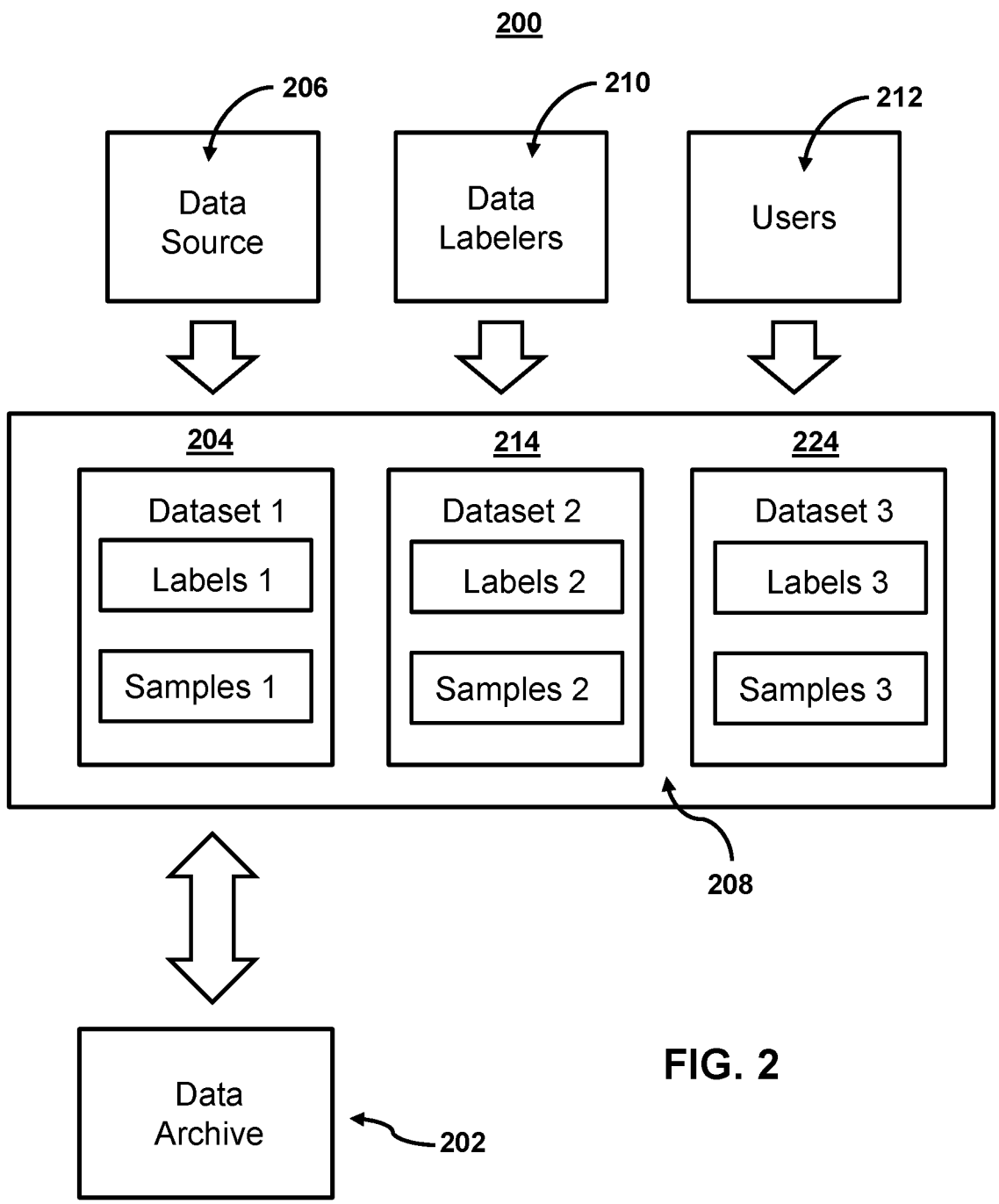
FIG. 2 shows an illustrative diagram for components used while labeling data, in accordance with one or more embodiments.

FIG. 2 shows an illustrative diagram for components used while labeling data for artificial intelligence model development, in accordance with one or more embodiments. For example, system 200 may comprise maintaining bifurcated data management while labeling data for artificial intelligence model development. As shown in FIG. 2, system 200 may comprise several components.

System 200 comprises a first data source (e.g., data source 202), wherein the first data source is accessible to a first subset of a plurality of users, wherein the first subset comprises a first attribute, wherein the first data source comprises a first dataset, and wherein the first data source comprises a relational database that stores a plurality of samples. For example, the first data source (e.g., data source 202) may comprise a relational database that comprises a plurality of samples. The relational database may receive user inputs to update versions of labels and/or perform other changes to data. The first data source may then push the dataset changes to a labeled data archive specific to the first grouping of source code files. A relational database is a collection of data items with predefined relationships between them. These items are organized as a set of tables with columns and rows. Tables are used to hold information about the objects to be represented in the database. For example, the relational database may comprise a set of tables corresponding to a dataset archive. The dataset archive may comprise samples and versions of labels corresponding to each sample. A relational database contains multiple tables of data that relate to each other and allow the user to specify information about multiple tables and the relationships between those tables, allowing more flexibility and control over database constraints.

System 200 comprises dataset 204, wherein dataset 204 is specific to a first grouping of source code files (e.g., a first workspace). For example, dataset 204 may comprise a dataset that is specific to a first grouping of source code files and/or a labeled data archive specific to the first grouping of source code files. Dataset 204 may comprise labels and/or samples related to the labeled data archive that pertain to a first data labeling project. Additionally or alternatively, the dataset 204 may comprise a history specific to the labeled data archive as well as any current projects and/or tasks. Using dataset 204, users and/or taggers may access the labeled data archive to perform one or more operations on the data in the labeled data archive. Dataset 204 may include both labels and samples that are specific to dataset 204.

System 200 comprises dataset 214, wherein dataset 214 is specific to a second grouping of source code files (e.g., a second workspace). For example, dataset 214 may comprise a dataset that is specific to a second grouping of source code files and/or a labeled data archive specific to the second grouping of source code files. Dataset 214 may comprise labels and/or samples related to the labeled data archive that pertain to a first data labeling project. Additionally or alternatively, the dataset 214 may comprise a history specific to the labeled data archive as well as any current projects and/or tasks. Using dataset 214, users and/or taggers may access the labeled data archive to perform one or more operations on the data in the labeled data archive. Dataset 214 may include both labels and samples that are specific to dataset 214.

System 200 comprises dataset 224, wherein dataset 224 is specific to a third grouping of source code files (e.g., a third workspace). For example, dataset 224 may comprise a dataset that is specific to a third grouping of source code files and/or a labeled data archive specific to the third grouping of source code files. Dataset 224 may comprise labels and/or samples related to the labeled data archive that pertain to a first data labeling project. Additionally or alternatively, the dataset 224 may comprise a history specific to the labeled data archive as well as any current projects and/or tasks. Using dataset 224, users and/or taggers may access the labeled data archive to perform one or more operations on the data in the labeled data archive. Dataset 224 may include both labels and samples that are specific to dataset 224.

The groupings of source code files may be accessible to a second subset of the plurality of users, wherein the second subset comprises a second attribute. For example, each dataset may be specific to a workspace. In some embodiments, each dataset source may comprise a labeled data archive specific to the first grouping of source code files. For example, the system may use one or more relational databases and/or flat-file databases. A flat file consists of a single table of data. It allows the user to specify data attributes, such as columns and data types, table by table and stores those attributes separate from applications. This type of file is commonly used to import data in data warehousing projects.

System 200 comprises a data source (e.g., data source 206), wherein the data source is accessible to a third subset of the plurality of users, wherein the third subset comprises a third attribute, and wherein the data source comprises unlabeled data sourced from the first data source. For example, the data source may comprise a raw data source (e.g., data source 206). In some embodiments, the raw unlabeled data may be sourced from a commonly accessible data lake. For example, the data source may comprise a data lake. A data lake is a system or repository of data stored in its natural/raw format, usually object blobs or files. A data lake is usually a single store of data including raw copies of source system data, sensor data, social data, etc., and transformed data used for tasks such as reporting, visualization, advanced analytics, and machine learning. A data lake can include structured data from relational databases (rows and columns), semi-structured data (CSV, logs, XML, JSON), unstructured data (emails, documents, PDFs), and binary data (images, audio, video).

In some embodiments, a first database (e.g., data source 206) may comprise a relational database. As such, the data source may contain multiple tables of data that relate to each other and allow the user to specify information about multiple tables and the relationships between those tables, allowing more flexibility and control over database constraints. For example, the system may access a first table of the first data source. The system may determine a relationship of the first table to a second table in the first data source. The system may access a second table of the first data source based on the relationship. The system may retrieve the first label from the second table.

In some embodiments, the system may receive data from multiple sources. By doing so, the system may avoid copying data to multiple locations and straining computing resources. Additionally, as the system only stores specific information (e.g., labels in a first data source, samples in a data source, and version metadata in a second data source (e.g., one or more datasets)), modifications to any of the data only affects data in a specific data source. Accordingly, a user may modify version metadata for a specific workspace without affecting the underlying label sample. For example, the system may query a data source for the first sample, wherein the data source is accessible to a third subset of the plurality of users, and wherein the data source comprises unlabeled data sourced from the first data source. The system may query the first data source for the first label, wherein the first data source comprises a plurality of labeled data archives, wherein each of the plurality of labeled data archives is specific to a respective workspace.

In some embodiments, the first data source may comprise a relational database service that pushes changes to a specific archive (e.g., corresponding to a given workspace). Each archive may itself have a project database service that may store workspace-, project-, and task-specific information. For example, the system may determine a first labeled data archive corresponding to a current workspace. The system may retrieve the first label from the first labeled data archive.

In some embodiments, the system may require a user to have a particular attribute or attributes to access different types of data. These attributes may comprise a role, an authorization, a relationship to a given workspace, and/or a security credential. For example, the system may apply different security requirements to the first label, first sample, and/or first dataset than the first version metadata. By doing so, the first version metadata may be more secured (e.g., through more advanced encryption). For example, the system may determine a user requesting the first label. The system may determine a user profile for the user. The system may determine a first credential for accessing the first data source. The system may determine whether to grant access to the first data source based on a first comparison of the user profile and the first credential.

System 200 comprises workspace 208, which may correspond to a workspace accessed via user interfaces in FIGS. 1A-1B. For example, workspace 208 may be accessed by data labelers (e.g., data labelers 210) and/or other users (e.g., users 212).

In some embodiments, the system may generate information about a sample, label, and/or other information that relates to the training data. For example, the system may generate one or more metrics about the size, makeup, and/or other information about the samples in the training data. By doing so, the system may allow users in a given workspace to better define the qualities of the training data without affecting the original training data. The system may determine a total number of samples in the second dataset. The system may generate for display the total number of samples.

In some embodiments, the system may generate information about a sample, label, and/or other information that may be used to compare training data from different datasets (and/or workspaces). For example, the system may describe a number, size, average confidence level, average consistency level, etc., for a given dataset (or workspace). The system may then compare this metric to generate recommendations about the quality of a current dataset. By doing so, the system may predict whether a current dataset is likely to suffer bias or other issues related to the data used. For example, the system may determine a first metric for samples in the first dataset. The system may determine a second metric for samples in the second dataset. The system may generate for display a comparison of the first metric and second metric.

In some embodiments, the system may receive additional annotations to metadata, a label, a sample, and/or a dataset. The system may limit the application of this annotation to data in a given workspace (e.g., in a given dataset). The system may receive a user annotation to the second dataset. The system may store the user annotation in the second dataset.

In some embodiments, the system may receive additional annotations to metadata, a label, a sample, and/or a dataset. The system may then automatically apply this annotation to the metadata for other labels in the workspace. By doing so, the system may quickly and efficiently populate changes to training data in a given workspace. For example, the system may generate for display an option to annotate the first version metadata. The system may receive an annotation to the first version metadata. The system may automatically modify, based on the annotation, the version metadata of labels in the first grouping of source code files.

In some embodiments, the system may maintain separate access requirements (e.g., users may require different security credentials) for different types of data, including metadata for samples. As such, the system may require users to have a first level of access to access a version metadata, a second level of access to access a label corresponding to the version metadata, and/or a third level of access to access a sample corresponding to the version metadata and/or label. By doing so, the system may maintain security of some data (e.g., by not exposing PII (e.g., personally identifiable information) to unauthorized users) while still allowing users access to other types of data needed to train (and/or make adjustments to) an artificial intelligence model. For example, the system may receive a third user input to access the first version metadata. The system may determine whether to grant access to the first version metadata based on a first comparison of user profile data and a first credential requirement. The system may receive a fourth user input to access the first label. The system may determine whether to grant access to the first label based on a fourth comparison of the user profile data and a second credential requirement.

The system may require a user to have a particular attribute or attributes to access different types of data. These attributes may comprise a role, an authorization, a relationship to a given workspace, and/or a security credential. For example, the system may apply different security requirements to the first label, first sample, and/or first dataset than the first version metadata. By doing so, the first version metadata may be more secured (e.g., through more advanced encryption). The system may determine a user requesting the first label. The system may determine a user profile for the user. The system may determine a first credential for accessing the first dataset. The system may determine whether to grant access to the first dataset based on a first comparison of the user profile data and the first credential requirement.

Data labelers 210 may review automated labeling tasks (e.g., as shown in FIG. 1B). For example, a data labeler may be an individual or a tool responsible for adding annotations, tags, or labels to raw data, particularly in the context of machine learning and artificial intelligence projects. Data labeling is a crucial step in the process of creating training datasets for supervised machine learning algorithms. These labels help the algorithms learn patterns and make predictions or classifications based on new, unseen data.

Data labelers are often tasked with examining and understanding the data, then assigning appropriate labels or annotations that capture the desired information. For instance, in an image recognition task, a data labeler might label objects within images to help train a model to recognize those objects in new images. Similarly, in NLP tasks, labelers might assign sentiment labels to text data for sentiment analysis models.

Figure 3:
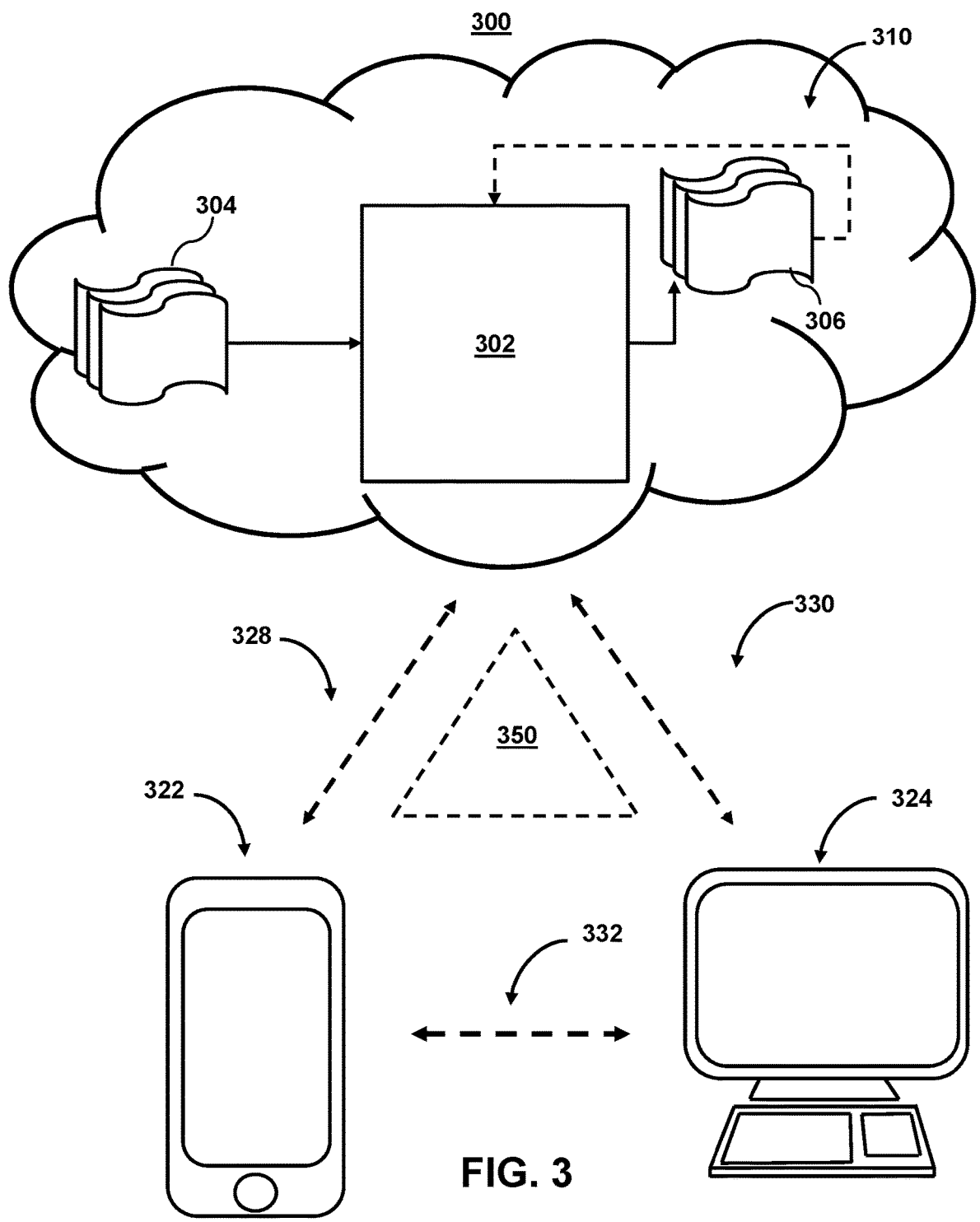
FIG. 3 shows illustrative components for a system used for data labeling, in accordance with one or more embodiments.

FIG. 3 shows illustrative components for a system used for data labeling, in accordance with one or more embodiments. For example, FIG. 3 may show illustrative components for data labeling. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a handheld computer, and other computer equipment (e.g., a server), including "smart," wireless, wearable, and/or mobile devices. FIG. 3 also includes cloud components 310. Cloud components 310 may alternatively be any computing device as described above and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data.

Additionally, as mobile device 322 and user terminal 324 are shown as a touchscreen smartphone and a personal computer, these displays also act as user input interfaces. It should be noted that in some embodiments, the devices may have neither user input interfaces nor displays and may instead receive and display content using another device (e.g., a dedicated display device such as a computer scree, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, virtual private networks, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include one or more of the components described in FIG. 2. Cloud components 310 may also include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., consistency of labels, predicted labels, version metadata, etc.).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., consistency of labels, predicted labels, version metadata, etc.).

In some embodiments, the model (e.g., model 302) may automatically perform actions based on outputs 306. In some embodiments, the model (e.g., model 302) may not perform any actions. The output of the model (e.g., model 302) may be used to determine the consistency of labels, predict labels, generate version metadata, etc.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or web services API layer) may provide a decoupled interface to data and/or functionality of one or more applications. API layer 350 may provide a common, language-agnostic way of interacting with an application. Web services APIs offer a well-defined contract, called WSDL, that describes the services in terms of the API's operations and the data types used to exchange information. REST APIs do not typically have this contract; instead, they are documented with client libraries for most common languages, including Ruby, Java, PHP, and JavaScript. SOAP web services have traditionally been adopted in the enterprise for publishing internal services as well as for exchanging information with partners in B2B transactions.

API layer 350 may use various architectural arrangements. For example, system 300 may be partially based on API layer 350, such that there is strong adoption of SOAP and RESTful web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer where microservices reside. In this kind of architecture, the role of API layer 350 may provide integration between front-end and back-end. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDOS protection, and API layer 350 may use RESTful APIs as standard for external integration.

Figure 4:
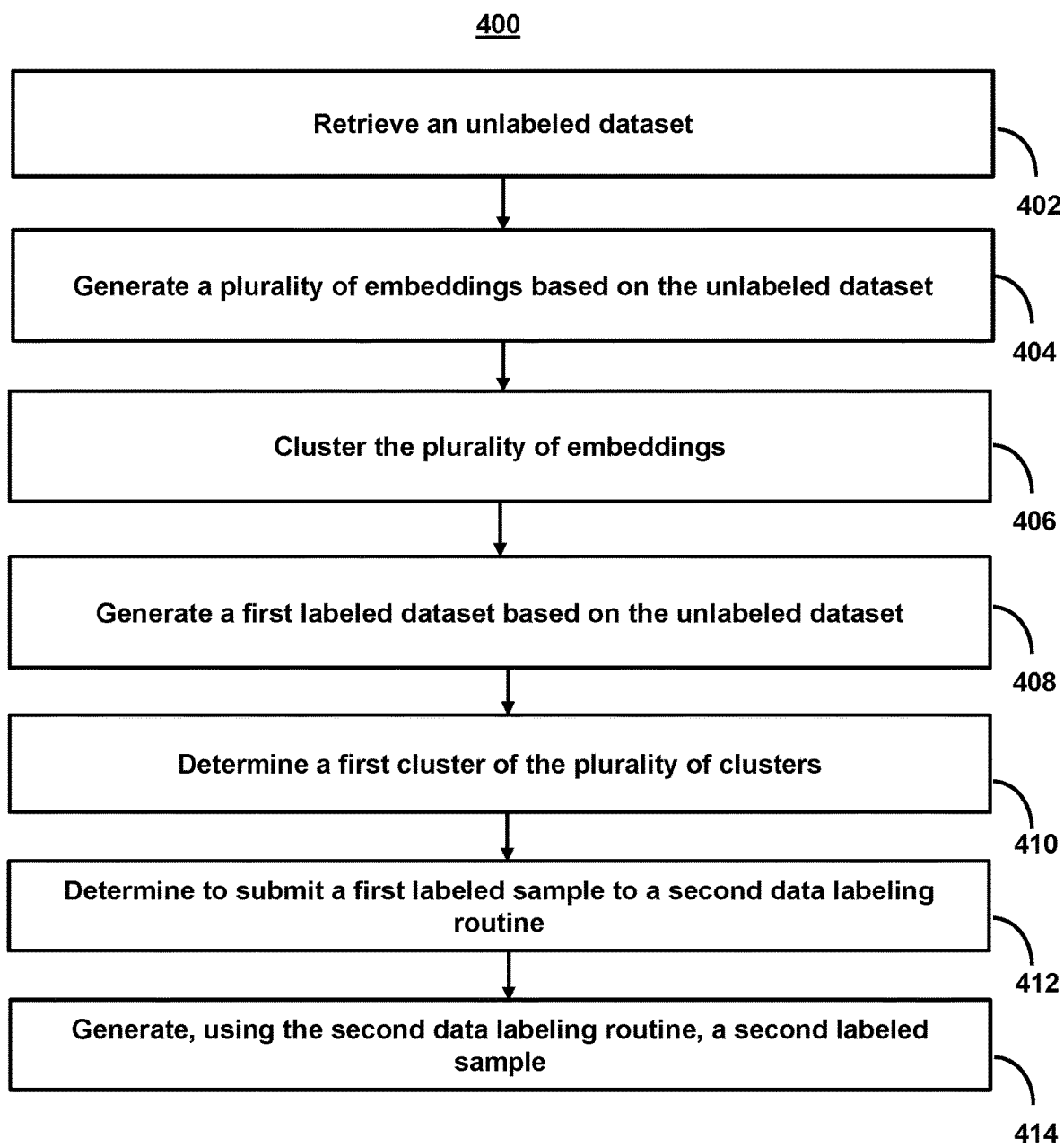
FIG. 4 shows a flowchart of the steps involved in identifying data labels for submitting to additional data labeling routines based on embedding clusters, in accordance with one or more embodiments.

FIG. 4 shows a flowchart of the steps involved in identifying data labels for submitting to additional data labeling routines based on embedding clusters, in accordance with one or more embodiments. For example, the system may use process 400 (e.g., as implemented on one or more system components described above) for data labeling.

At step 402, process 400 (e.g., using one or more components described above) retrieves an unlabeled dataset. For example, the system may retrieve an unlabeled dataset, wherein the unlabeled dataset comprises a plurality of unlabeled samples. The system may gather raw and unstructured data from various sources. This could be images, text documents, audio recordings, videos, sensor data, etc. This data will serve as the basis for creating a labeled dataset. For example, when performing human labeling tasks on linguistic based samples, random sampling techniques may be used, with the intention that random sampling will make representative examples of the different types of samples (and their corresponding intents) available. However, there are no guarantees that this approach actually produces a variety of samples, and it also does not surface examples that might be unique or unaccounted for. Outliers, either from the data as a whole or associated with a specific cluster, are exemplary of data samples that might not have a relevant intent.

At step 404, process 400 (e.g., using one or more components described above) generates a plurality of embeddings based on the unlabeled dataset. For example, the system may generate a plurality of embeddings based on the unlabeled dataset, wherein the plurality of embeddings comprises a respective embedding for each unlabeled sample in the plurality of unlabeled samples.

In some embodiments, the system may generate an embedding of data by representing high-dimensional data in a lower-dimensional space while preserving relevant patterns, relationships, and/or similarities among the data points. For example, the system may retrieve a first unlabeled sample, wherein the first unlabeled sample has a first dimensionality. The system may generate a first embedding, wherein the first embedding has a second dimensionality, and wherein the second dimensionality is lower than first dimensionality. In NLP, words or phrases are mapped to high-dimensional vectors, often based on their co-occurrence patterns in a large corpus of text. Techniques like Word2Vec and GloVe use neural networks to learn dense vector representations that capture semantic relationships between words. These embeddings can be used for various NLP tasks like sentiment analysis, text generation, and machine translation. For images, embeddings can be generated using deep convolutional neural networks (CNNs). The activations from intermediate layers of the CNN, such as the output of a fully connected layer or a pooling layer, can serve as image embeddings. These embeddings capture visual features in the data, allowing for tasks like image classification, object detection, and image retrieval. In graph-based data, nodes and edges are embedded into lower-dimensional spaces while preserving graph structure and node relationships. Techniques like Node2Vec and GraphSAGE use random walks and neural networks to generate node embeddings that capture graph topology and node similarities.

At step 406, process 400 (e.g., using one or more components described above) clusters the plurality of embeddings. For example, the system may cluster the plurality of embeddings into a plurality of clusters. The system may use one or more clustering algorithms such as k-Means, hierarchical, and/or Density-Based Clustering (DBSCAN). In k-Means, the assignment and center update steps are repeated iteratively until the cluster centers stabilize or convergence criteria are met. In hierarchical clustering, a hierarchy of clusters is built iteratively by merging or splitting clusters based on a defined linkage criterion (e.g., complete, single, or average linkage). In DBSCAN, clusters are formed based on the density of data points within a specified radius. Points that are close enough form clusters, while those in sparse regions remain unassigned.

To cluster the plurality of embeddings into a plurality of clusters, the system may prepare an unlabeled dataset. For example, when generating the embeddings, the system may prepare the data by representing it in a suitable format. Features should be appropriately scaled, and irrelevant or noisy features may need to be removed. The system may determine a distance metric. For example, the system may choose an appropriate distance metric to measure the similarity or dissimilarity between data points such as Euclidean distance, cosine similarity, and Jaccard similarity. The system may initialize cluster centers for the plurality of clusters. For example, the system may initialize K cluster centroids randomly or by using a more strategic method. These centers represent the initial guesses for cluster centroids. The system may assign data points corresponding to the unlabeled dataset to the plurality of clusters. For example, the system may, depending on the algorithm, assign data points to clusters iteratively based on a similarity metric. For k-Means, this involves calculating distances and assigning data points to the nearest cluster center.

At step 408, process 400 (e.g., using one or more components described above) generates a first labeled dataset based on the unlabeled dataset. For example, the system may generate a first labeled dataset based on the unlabeled dataset, wherein the first labeled dataset comprises a first plurality of labeled samples, and wherein the first plurality of labeled samples is generated using a first data labeling routine, wherein the first data labeling routine uses a first model.

In some embodiments, the system may use a plurality of data labeling routines. The data labeling routines may each have differing characteristics. For example, each data routine may comprise an individually selected data collection (e.g., how data is gathered), labeling guidelines (e.g., clear and detailed guidelines that define how each type of data should be labeled to ensure consistency in the labeling process, making sure that different annotators or labelers interpret and apply labels in the same way), labeler selection (e.g., choosing labelers or annotators who have a good understanding of the labeling guidelines and the domain of the data in addition to whether labelers are human (e.g., human annotators or even crowdsourced workers), models, and/or a mixture thereof), labeling process (e.g., how prescribed labels or annotations to the raw data are applied using tasks such as bounding box annotations, image segmentation, text categorization, sentiment analysis, etc.), quality control procedures (e.g., how a quality control process to review the labeled data for accuracy and consistency is implemented), iterations required (e.g., how feedback from quality control and ongoing communication with labelers can lead to refinement of the guidelines and improved consistency), ambiguity handling (e.g., how the system for flagging and resolving ambiguous cases should be established, which might involve collaboration between labelers and domain experts), models used, frequency of updates (e.g., over time, the labeled dataset may need updates due to changes in the task requirements, domain, and/or feedback from model performance), and/or privacy settings (e.g., ensuring that any sensitive or private information in the data is properly anonymized or protected during the labeling process to maintain data privacy).

At step 410, process 400 (e.g., using one or more components described above) determines a first cluster of the plurality of clusters. For example, the system may determine that a first cluster of the plurality of clusters has a first cluster characteristic. For example, a cluster may comprise a subgroup of data that shares similar characteristics with and is significantly different from other clusters in a dataset, usually defined by the statistical technique of cluster analysis.

In some embodiments, the system may detect the number of labels in a cluster and prioritize review based on the number. For example, the system may look for labels that are within tight clusters and intentionally get a variety from each of the clusters (e.g., ensuring that the system has a representative sample of common data). For example, the system may determine a number of data labels in the first cluster. The system may determine the first cluster characteristic based on the number of data labels.

In some embodiments, the system may use distance algorithms to prioritize manual labeling. For example, the system may use the data labels that have the greatest distance from their nearest neighbors and prioritize those for labeling. By doing so, the system may find the most likely unaccounted for terms. For example, the system may determine an average distance between data labels in the first cluster. The system may determine the first cluster characteristic based on the average distance.

In some embodiments, the system may apply a weighted technique, where the system selects proportional numbers of samples from each cluster based on the percentage of overall data points within each cluster. The system may use some percentage of the samples that come from each set. For example, the system may determine a percentage of first plurality of labeled samples in the first cluster. The system may determine the first cluster characteristic based on the percentage.

In some embodiments, the system may perform random sampling within these subsets instead of sampling across all sets. As an example, the system could find the 10,000 data points that are most distant from their neighbors and randomly select 2,000 of them to be labeled. For example, the system may determine a distance between a first centroid for the first cluster and a second centroid for a second cluster. The system may determine the first cluster characteristic based on the distance.

At step 412, process 400 (e.g., using one or more components described above) determines to submit a first labeled sample to a second data labeling routine. For example, the system may, based on the first cluster having the first cluster characteristic, determine a first labeled sample of the first labeled dataset corresponding to the first cluster.

In some embodiments, the system may determine a first labeled sample of the first labeled dataset corresponding to the first cluster by determining a sample size for sampling the first cluster and selecting, using a random number generator, a subset of labeled samples corresponding to the first cluster, wherein a number of labeled samples in the subset corresponds to the sample size.

In some embodiments, the system may perform random sampling. For example, random sampling comprises retrieving a subset (or portion) of individuals from a larger population (e.g., the unlabeled dataset) in a way that each individual has an equal chance of being included in the sample. This process helps ensure that the sample is representative of the larger population, which is important for making valid inferences. For example, the system may define a population from which the system draws a random sample.

In some embodiments, the system may randomly sample the unlabeled dataset. For example, the system may assign unique numbers to each population member and use the generated random numbers to directly identify the individuals who will be included in the sample. The system may use a plurality of sampling techniques such as simple random sampling (e.g., a unique number is assigned to each population member and the generated random numbers are used to directly identify the individuals who will be included in the sample), stratified random sampling (e.g., the population is divided into subgroups (strata) based on certain characteristics, and then a random sample is taken from each subgroup), cluster random sampling (e.g., the population is divided into clusters and a random sample of clusters is selected, with all members within the selected clusters included in the sample).

In some embodiments, the system may determine a sample size based on the number of features of the second model. For example, if the system has a high number of features (variables) compared to the sample size, the system may encounter technical problems related to the dimensionality. In such cases, a larger sample size is needed to avoid overfitting.

In some embodiments, the system may determine a sample size based on a required performance (e.g., confidence level, margin of error, etc.) of the second model. For example, if the system estimates the model's performance with a higher degree of confidence, the system may use a larger sample size. This is particularly relevant in statistical hypothesis testing. In another example, when estimating certain metrics (e.g., accuracy) with a specific margin of error, the system may determine a larger sample size to achieve the desired level of precision.

In some embodiments, the system may select the sample size based on the number of hyperparameters requiring training. For example, the complexity of the labeling and/or number of classifications may influence the required sample size. More complex labeling and/or a higher number of classifications with intricate patterns may require larger samples to capture these patterns adequately. As another example, highly complex models, such as deep neural networks with many parameters, may require more data to generalize well and avoid overfitting.

In some embodiments, the system may determine the sample size based on the data variability of the unlabeled dataset of a first labeled dataset. For example, higher variability in the data might require a larger sample size to ensure that the model captures the underlying patterns and does not mistake noise for signal. As another example, if the dataset represents only a small fraction of the entire population, the system may need a larger sample size to ensure that the sample is representative.

In some embodiments, the system may determine the sample size based on validation type of the second model. For example, if the system uses cross-validation to evaluate the model's performance, the system needs to ensure that each fold has a sufficient sample size. For example, cross-validation is a technique used in machine learning and statistics to assess the performance of a predictive model and estimate its generalization ability on new, unseen data. It involves partitioning a dataset into subsets for training and validation, allowing for a more robust evaluation of the model's performance. The primary purpose of cross-validation is to provide a more accurate estimate of a model's performance than simply using a single train-test split. It helps address issues like overfitting and provides a better understanding of how well the model is likely to perform on new data. In contrast, an out-of-sample testing relies on testing the model's performance on completely new and independent data that was not part of the training or validation process, which does not require holdout data on limits on sample size as new data may become available after model deployment.

Based on the first cluster having the first cluster characteristic, the system may also determine to submit the first labeled sample to a second data labeling routine. The data and/or dataset may be defined by a characteristic of the cluster (and/or data in the cluster). For example, the characteristic may comprise any attribute that distinguishes one cluster (or data in that cluster) from another. For example, a characteristic may comprise a number of samples in a cluster, a percentage of total samples in a dataset in a given cluster, a percentage of samples in a cluster, data about a given sample and/or label in the cluster, and/or other information related to the cluster.

At step 414, process 400 (e.g., using one or more components described above) generates, using the second data labeling routine, a second labeled sample. For example, the system may generate, using the second data labeling routine, a second labeled sample based on the first labeled sample.

In some embodiments, the system may relabel samples that do not have a threshold confidence metric. Alternatively or additionally, the system can randomly sample from the new labels and then use the additional inputs in order to re-predict the non-manually labeled samples in question. Those that are still below the confidence threshold would then be sampled from again. This process would continue until all of the labels exceeded the confidence threshold or had been manually labeled. For example, the system may delete the first labeled sample from the first plurality of labeled samples. The system may add the second labeled sample to the first plurality of labeled samples.

In some embodiments, the second data labeling routine may comprise a model that can automate and assist with data labeling tasks. The models may use a variety of algorithms. For example, the system may use active learning algorithms that select the most informative data points for annotation, thus maximizing the learning efficiency of the model. These algorithms query human annotators to label instances that the model is uncertain about. As the model improves, it focuses on labeling more challenging cases. In another example, semi-supervised learning combines labeled and unlabeled data to train models. These models learn from the labeled data and use the unlabeled data to generalize more effectively. This approach can reduce the need for extensive manual labeling. In another example, the system may use transfer learning, which involves training a model on a related task with a large labeled dataset and then fine-tuning it on a smaller, task-specific dataset. This approach leverages the knowledge gained from the pretraining phase, reducing the amount of manual labeling required. In another example, the system may use a weakly supervised learning. In weakly supervised learning, models are trained with partial or noisy labels, reducing the labeling burden. Techniques like multi-instance learning, where only certain instances in a bag are labeled, are examples of weakly supervised approaches. In another example, the system may use reinforcement learning. Reinforcement learning agents can be trained to interact with environments and gather data that helps in model training. This approach is particularly useful when labeling involves complex actions or decisions.

In some embodiments, the system may allow for manual review and/or confirmation of labels. In such instances, the system may generate for display that various annotations, such as classification of labels (e.g., assigning categories or classes to data instances, such as classifying images of animals into different species), bounding boxes (e.g., drawing boxes around objects within images to indicate their location and boundaries), segmentation masks (e.g., drawing boxes around objects within images to indicate their location and boundaries), sentiment labels (e.g., assigning sentiment scores or labels (e.g., positive, negative, neutral) to text data), named entity recognition (e.g., identifying and labeling specific entities (like names, dates, locations) within text), part-of-speech tagging (e.g., labeling individual words in sentences with their grammatical parts of speech), and/or temporal labels (e.g., marking time-related information, such as event dates or durations) assigned to a label. For example, the system may generate for display, in a user interface, first metadata corresponding to the first labeled sample. The system may receive a user input confirming the first labeled sample based on the first metadata.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for identifying data labels for submitting to additional data labeling routines based on embedding clusters.

2. The method of the preceding embodiment, the method comprising: retrieving an unlabeled dataset, wherein the unlabeled dataset comprises a plurality of unlabeled samples; generating a plurality of embeddings based on the unlabeled dataset, wherein the plurality of embeddings comprises a respective embedding for each unlabeled sample in the plurality of unlabeled samples; clustering the plurality of embeddings into a plurality of clusters; generating a first labeled dataset based on the unlabeled dataset, wherein the first labeled dataset comprises a first plurality of labeled samples, and wherein the first plurality of labeled samples is generated using a first data labeling routine, wherein the first data labeling routine uses a first model; determining that a first cluster of the plurality of clusters has a first cluster characteristic; based on the first cluster having the first cluster characteristic: determining a first labeled sample of the first labeled dataset corresponding to the first cluster; and determining to submit the first labeled sample to a second data labeling routine; and generating, using the second data labeling routine, a second labeled sample based on the first labeled sample.

3. The method of any one of the preceding embodiments, wherein generating the plurality of embeddings based on the unlabeled dataset further comprises: retrieving a first unlabeled sample, wherein the first unlabeled sample has a first dimensionality; and generating a first embedding, wherein the first embedding has a second dimensionality, and wherein the second dimensionality is lower than first dimensionality.

4. The method of any one of the preceding embodiments, wherein clustering the plurality of embeddings into the plurality of clusters further comprises: preparing an unlabeled dataset; determining a distance metric; initializing cluster centers for the plurality of clusters; and assigning data points corresponding to the unlabeled dataset to the plurality of clusters.

5. The method of any one of the preceding embodiments, wherein determining that the first cluster of the plurality of clusters has the first cluster characteristic further comprises: determining a number of data labels in the first cluster; and determining the first cluster characteristic based on the number of data labels.

6. The method of any one of the preceding embodiments, wherein determining that the first cluster of the plurality of clusters has the first cluster characteristic further comprises: determining an average distance between data labels in the first cluster; and determining the first cluster characteristic based on the average distance.

7. The method of any one of the preceding embodiments, wherein determining that the first cluster of the plurality of clusters has the first cluster characteristic further comprises: determining a percentage of first plurality of labeled samples in the first cluster; and determining the first cluster characteristic based on the percentage.

8. The method of any one of the preceding embodiments, wherein determining that the first cluster of the plurality of clusters has the first cluster characteristic further comprises: determining a distance between a first centroid for the first cluster and a second centroid for a second cluster; and determining the first cluster characteristic based on the distance.

9. The method of any one of the preceding embodiments, wherein generating the second labeled sample further comprises: deleting the first labeled sample from the first plurality of labeled samples; and adding the second labeled sample to the first plurality of labeled samples.

10. The method of any one of the preceding embodiments, wherein determining the first labeled sample of the first labeled dataset corresponding to the first cluster further comprises: determining a sample size for sampling the first cluster; and selecting, using a random number generator, a subset of labeled samples corresponding to the first cluster, wherein a number of labeled samples in the subset corresponds to the sample size.

11. The method of any one of the preceding embodiments, wherein determining the sample size further comprises: determining a number of features of the first model; and selecting the sample size based on the number of features.

12. The method of any one of the preceding embodiments, wherein determining the sample size further comprises: determining a required performance of the first model; and selecting the sample size based on the required performance.

13. The method of any one of the preceding embodiments, wherein determining the sample size further comprises: determining a number of hyperparameters requiring training for the first model; and selecting the sample size based on the number of hyperparameters requiring training.

14. The method of any one of the preceding embodiments, wherein determining the sample size further comprises: determining a data variability of the first labeled dataset; and selecting the sample size based on the data variability.

15. The method of any one of the preceding embodiments, wherein determining the sample size further comprises: determining a validation type of the first model; and selecting the sample size based on the validation type.

16. The method of any one of the preceding embodiments, wherein generating the second labeled sample based on the first labeled sample further comprises: generating for display, in a user interface, first metadata corresponding to the first labeled sample; and receiving a user input confirming the first labeled sample based on the first metadata.

17. A tangible, non-transitory, machine-readable medium storing instructions that, when executed by a data processing apparatus, cause the data processing apparatus to perform operations comprising those of any of embodiments 1-16.

18. A system comprising one or more processors; and memory storing instructions that, when executed by the processors, cause the processors to effectuate operations comprising those of any of embodiments 1-16.

19. A system comprising means for performing any of embodiments 1-16.

What is claimed is:

1. A system for identifying data labels for submitting to additional data labeling routines based on embedding clusters, the system comprising:
   one or more processors; and
   one or more non-transitory, computer-readable mediums comprising instructions that when executed by the one or more processors cause operations comprising:
      retrieving an unlabeled dataset, wherein the unlabeled dataset comprises a plurality of unlabeled samples, wherein the plurality of unlabeled samples is based on unstructured text based on linguistic inputs;
      generating a plurality of embeddings based on the unlabeled dataset, wherein the plurality of embeddings comprises a respective embedding for each unlabeled sample in the plurality of unlabeled samples;
      clustering the plurality of embeddings into a plurality of clusters;
      generating a first labeled dataset based on the unlabeled dataset, wherein the first labeled dataset comprises a first plurality of labeled samples, and wherein the first plurality of labeled samples is generated using a first data labeling routine;
      determining that a first cluster of the plurality of clusters has a first cluster characteristic, wherein the first cluster characteristic comprises a similarity between data in the first cluster, and wherein the similarity indicates respective distances between the data in the first cluster;
      based on the first cluster having the first cluster characteristic:
         determining a first labeled sample of the first labeled dataset corresponding to the first cluster; and
         determining to submit the first labeled sample to a second data labeling routine;
      generating, using the second data labeling routine, a second labeled sample based on the first labeled sample;

deleting the first labeled sample from the first plurality of labeled samples; and adding the second labeled sample to the first plurality of labeled samples.

2. A method for identifying data labels for submitting to additional data labeling routines based on embedding clusters, the method comprising:

retrieving an unlabeled dataset, wherein the unlabeled dataset comprises a plurality of unlabeled samples;

generating a plurality of embeddings based on the unlabeled dataset, wherein the plurality of embeddings comprises a respective embedding for each unlabeled sample in the plurality of unlabeled samples;

clustering the plurality of embeddings into a plurality of clusters;

generating a first labeled dataset based on the unlabeled dataset, wherein the first labeled dataset comprises a first plurality of labeled samples, and wherein the first plurality of labeled samples is generated using a first data labeling routine, wherein the first data labeling routine uses a first model;

determining that a first cluster of the plurality of clusters has a first cluster characteristic, wherein the first cluster characteristic comprises a similarity between data in the first cluster, and wherein the similarity indicates respective distances between the data in the first cluster;

based on the first cluster having the first cluster characteristic:
    determining a first labeled sample of the first labeled dataset corresponding to the first cluster; and
    determining to submit the first labeled sample to a second data labeling routine; and generating, using the second data labeling routine, a second labeled sample based on the first labeled sample.

3. The method of claim 2, wherein generating the plurality of embeddings based on the unlabeled dataset further comprises:

retrieving a first unlabeled sample, wherein the first unlabeled sample has a first dimensionality; and generating a first embedding, wherein the first embedding has a second dimensionality, and wherein the second dimensionality is lower than first dimensionality.

4. The method of claim 2, wherein clustering the plurality of embeddings into the plurality of clusters further comprises:

preparing an unlabeled dataset;

determining a distance metric;

initializing cluster centers for the plurality of clusters; and assigning data points corresponding to the unlabeled dataset to the plurality of clusters.

5. The method of claim 2, wherein determining that the first cluster of the plurality of clusters has the first cluster characteristic further comprises:

determining a number of data labels in the first cluster; and determining the first cluster characteristic based on the number of data labels.

6. The method of claim 2, wherein determining that the first cluster of the plurality of clusters has the first cluster characteristic further comprises:

determining an average distance between data labels in the first cluster; and determining the first cluster characteristic based on the average distance.

7. The method of claim 2, wherein determining that the first cluster of the plurality of clusters has the first cluster characteristic further comprises:

determining a percentage of first plurality of labeled samples in the first cluster; and determining the first cluster characteristic based on the percentage.

8. The method of claim 2, wherein determining that the first cluster of the plurality of clusters has the first cluster characteristic further comprises:

determining a distance between a first centroid for the first cluster and a second centroid for a second cluster; and determining the first cluster characteristic based on the distance.

9. The method of claim 2, wherein generating the second labeled sample further comprises:

deleting the first labeled sample from the first plurality of labeled samples; and adding the second labeled sample to the first plurality of labeled samples.

10. The method of claim 2, wherein determining the first labeled sample of the first labeled dataset corresponding to the first cluster further comprises:

determining a sample size for sampling the first cluster; and selecting, using a random number generator, a subset of labeled samples corresponding to the first cluster, wherein a number of labeled samples in the subset corresponds to the sample size.

11. The method of claim 10, wherein determining the sample size further comprises:

determining a number of features of the first model; and selecting the sample size based on the number of features.

12. The method of claim 10, wherein determining the sample size further comprises:

determining a required performance of the first model; and selecting the sample size based on the required performance.

13. The method of claim 10, wherein determining the sample size further comprises:

determining a number of hyperparameters requiring training for the first model; and selecting the sample size based on the number of hyperparameters requiring training.

14. The method of claim 10, wherein determining the sample size further comprises:

determining a data variability of the first labeled dataset; and selecting the sample size based on the data variability.

15. The method of claim 10, wherein determining the sample size further comprises:

determining a validation type of the first model; and selecting the sample size based on the validation type.

16. The method of claim 2, wherein generating the second labeled sample based on the first labeled sample further comprises:

generating for display, in a user interface, first metadata corresponding to the first labeled sample; and receiving a user input confirming the first labeled sample based on the first metadata.

17. One or more non-transitory, computer-readable mediums comprising instructions that when executed by one or more processors cause operations comprises:

retrieving an unlabeled dataset, wherein the unlabeled dataset comprises a plurality of unlabeled samples;

generating a plurality of embeddings based on the unlabeled dataset, wherein the plurality of embeddings comprises a respective embedding for each unlabeled sample in the plurality of unlabeled samples;

clustering the plurality of embeddings into a plurality of clusters;

generating a first labeled dataset based on the unlabeled dataset, wherein the first labeled dataset comprises a first plurality of labeled samples, and wherein the first plurality of labeled samples is generated using a first data labeling routine;

determining that a first cluster of the plurality of clusters has a first cluster characteristic, wherein the first cluster characteristic comprises a similarity between data in the first cluster, and wherein the similarity indicates respective distances between the data in the first cluster;

based on the first cluster having the first cluster characteristic:
  determining a first labeled sample of the first labeled dataset corresponding to the first cluster; and
  determining to submit the first labeled sample to a second data labeling routine; and generating, using the second data labeling routine, a second labeled sample based on the first labeled sample.

18. The one or more non-transitory, computer-readable mediums of claim 17, wherein generating the plurality of embeddings based on the unlabeled dataset further comprises:
  retrieving a first unlabeled sample, wherein the first unlabeled sample has a first dimensionality; and
  generating a first embedding, wherein the first embedding has a second dimensionality, and wherein the second dimensionality is lower than first dimensionality.

19. The one or more non-transitory, computer-readable mediums of claim 17, wherein clustering the plurality of embeddings into the plurality of clusters further comprises:
  preparing an unlabeled dataset;
  determining a distance metric;
  initializing cluster centers for the plurality of clusters; and
  assigning data points corresponding to the unlabeled dataset to the plurality of clusters.

20. The one or more non-transitory, computer-readable mediums of claim 17, wherein determining the first labeled sample of the first labeled dataset corresponding to the first cluster further comprises:
  determining a sample size for sampling the first cluster; and
  selecting, using a random number generator, a subset of labeled samples corresponding to the first cluster, wherein a number of labeled samples in the subset corresponds to the sample size.

* * * * *